March 26, 1968     T. J. MICHIE ETAL     3,374,771
AQUARIUM

Filed Jan. 18, 1966     4 Sheets-Sheet 1

INVENTORS.
THOMAS J. MICHIE and
JOHN C. BIGHAM
BY Hood, Gust & Irish
Attorneys

March 26, 1968  T. J. MICHIE ETAL  3,374,771
AQUARIUM
Filed Jan. 18, 1966  4 Sheets-Sheet 2
Fig. 2.
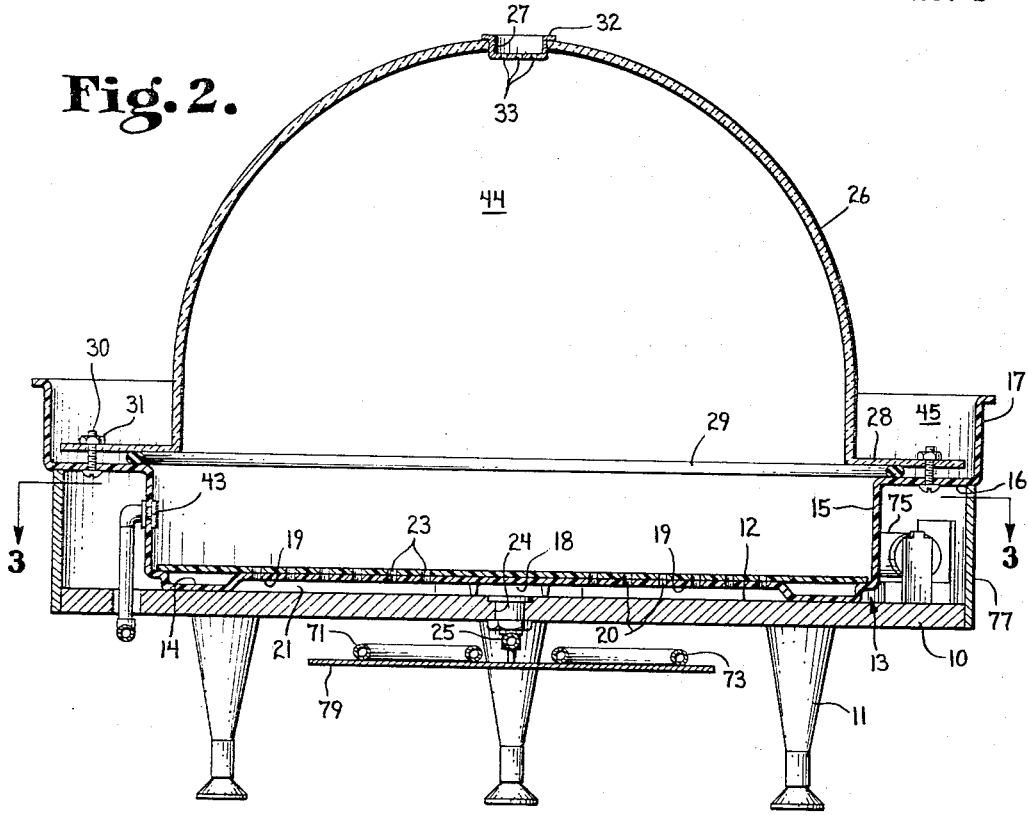
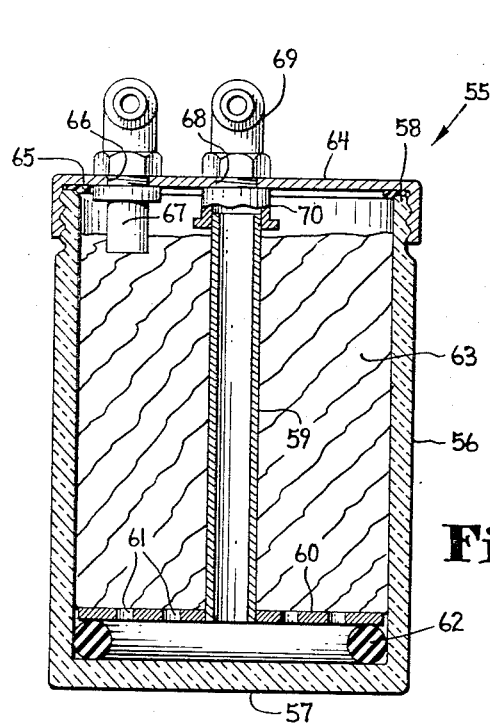
Fig. 4.
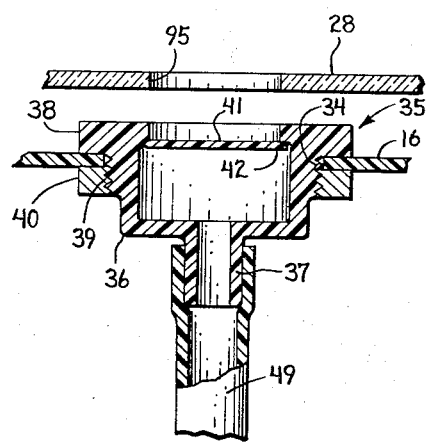
Fig. 5.
INVENTORS.
THOMAS J. MICHIE and
JOHN C. BIGHAM
BY Hood, Gust & Irish
Attorneys March 26, 1968 T. J. MICHIE ETAL 3,374,771
AQUARIUM
Filed Jan. 18, 1966 4 Sheets-Sheet 3
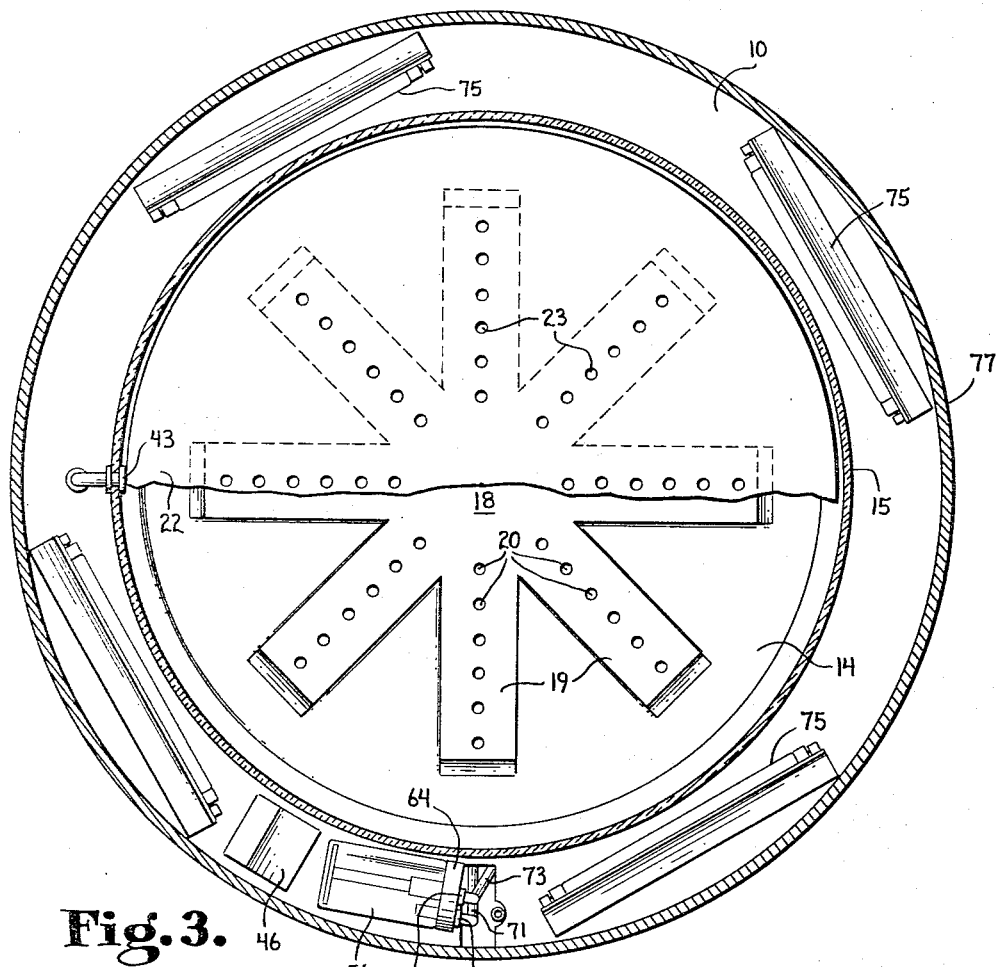
Fig. 3.
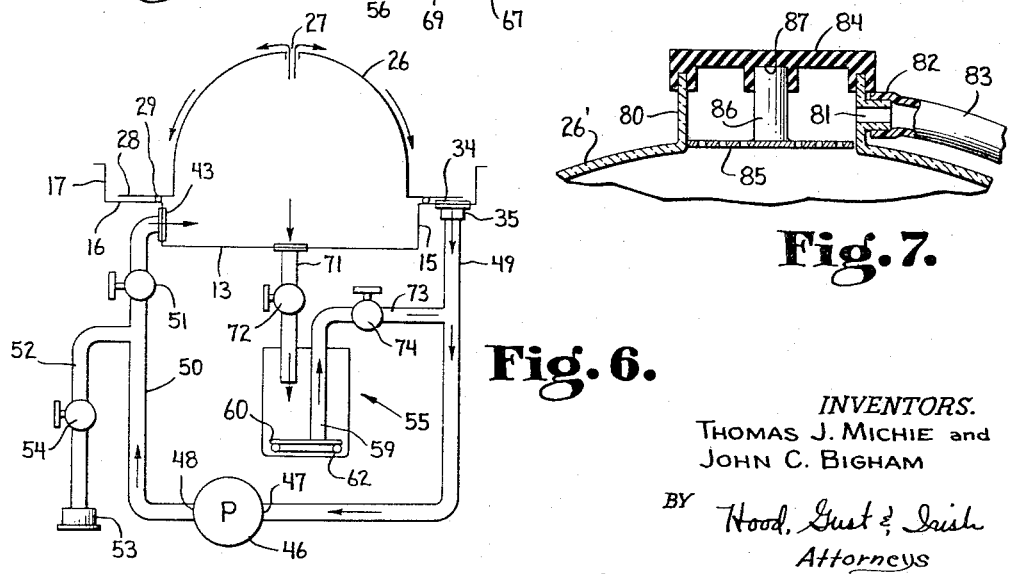
Fig. 6.
Fig. 7.
INVENTORS.
THOMAS J. MICHIE and
JOHN C. BIGHAM
BY Hood, Gust & Irish
Attorneys March 26, 1968  T. J. MICHIE ETAL  3,374,771
AQUARIUM Filed Jan. 18, 1966

INVENTORS.
THOMAS J. MICHIE and
JOHN C. BIGHAM

BY Hood, Gust & Irish
Attorneys

United States Patent Office 3,374,771
Patented Mar. 26, 1968

3,374,771
AQUARIUM
Thomas J. Michie, 4131 Meadows Drive, Apt. E-1, Indianapolis, Ind. 46205, and John C. Bigham, Indianapolis, Ind.; said Bigham assignor to said Michie
Filed Jan. 18, 1966, Ser. No. 521,291
19 Claims. (Cl. 119—5)

ABSTRACT OF THE DISCLOSURE

A dome-shaped aquarium provided with a water circulation system including a reservoir establishing an auxiliary or secondary pool separate from the main pool in the dome, and pumping means for delivering water to the main pool whence it will flow through an egress port substantially at the polar point of the dome back to the reservoir, which is open to the atmosphere for aeration of the circulating water, and from which it is drawn by the pump. In a preferred form, the auxiliary pool circumscribes the base of the dome and water from the egress port cascades over the external surface of the dome into the reservoir. Filter means, preferably of specified characteristics, may be cut into the circulating system by manipulation of valving means; a novel drainage means is provided; a cleaner device, energized by the circulatory water flow, may be utilized in either the main pool or the auxiliary pool; special illuminating means is provided; and the aquarium floor is specially designed to accommodate vegetation and other decorations without interference with circuation, cleaning, filtration and partial or complete drainage.

---

The present invention relates to an aquarium and is particularly concerned with the provision of an aquarium of novel and highly attractive appearance and with the provision of improved means for recirculating and aerating the water in such an aquarium.

Tropical fish, particularly, will not long survive in running water, even if such water is unchlorinated and warm enough; and therefore it is particularly important, in an aquarium of the type herein under consideration, to maintain a body of effectively aerated water in constant recirculation, and to provide effective means for filtering such body of water in order to remove contaminations therefrom.

While the primary object of the invention is to provide an unusually attractive aquarium, a further object of substantially equal importance is to provide effective means for maintaining a healthy environment for the animal and plant occupants of the aquarium. Thus, further objects of the invention include the employment of a bowl and a dome formed from transparent plastic material to define a main water pool, in combination with means for circulating, aerating and filtering the water which makes up that pool. Another object of the invention is to provide, in a such a system, a reservoir or auxiliary pool which is open to the atmosphere. Still another object is to provide for forced circulation by means of positive pump means rather than through the medium of air bubbles, thermo-siphon means or the like.

A further object of the invention is to provide an aquarium of the character described in which the circulation and aeration circuit includes a stage in which the water emerges from the main pool through an egress port at the apex of the doom and flows, in contact with the circumambient atmosphere, downwardly over the external surface of the dome in a thin and continuous sheet or veil into a circumscribing auxiliary pool at the base of the dome, thus producing, in addition to effective aeration, an unusually pleasing optical effect.

A further object of the invention is to provide an aquarium of the character described including illumination means, arranged about the base of the dome but hidden from external view, and so located as effectively to illuminate the water body within the dome through the light sources are completely invisible to viewers.

Still another object of the invention is to provide control means for the recirculation system whereby the rate of flow of water over the external surface of the dome is readily controllable.

Further objects of the invention will appear as the description proceeds.

To the accomplishment of the above and related objects, our invention may be embodied in the forms illustrated in the accompanying drawings, attention being called to the fact, however, that the drawings are illustrative only, and that change may be made in the specific constructions illustrated and described, so long as the scope of the appended claims is not violated.

FIG. 2 is a vertical section of the same, taken substantially on the line 2—2 of FIG. 1;

FIG. 3 is a horizontal section taken substantially on the line 3—3 of FIG. 2;

FIG. 4 is an enlarged, vertical section through a filter unit constituting an element of the preferred form of aquarium assembly;

FIG. 5 is an enlarged, vertical, fragmentary section of a detail;

FIG. 6 is a flow diagram, illustrating the circulation and filtering system embodied in the preferred form of the present invention;

FIG. 7 is a fragmentary section showing a detail of a modified form of aquarium;

Figure 1:
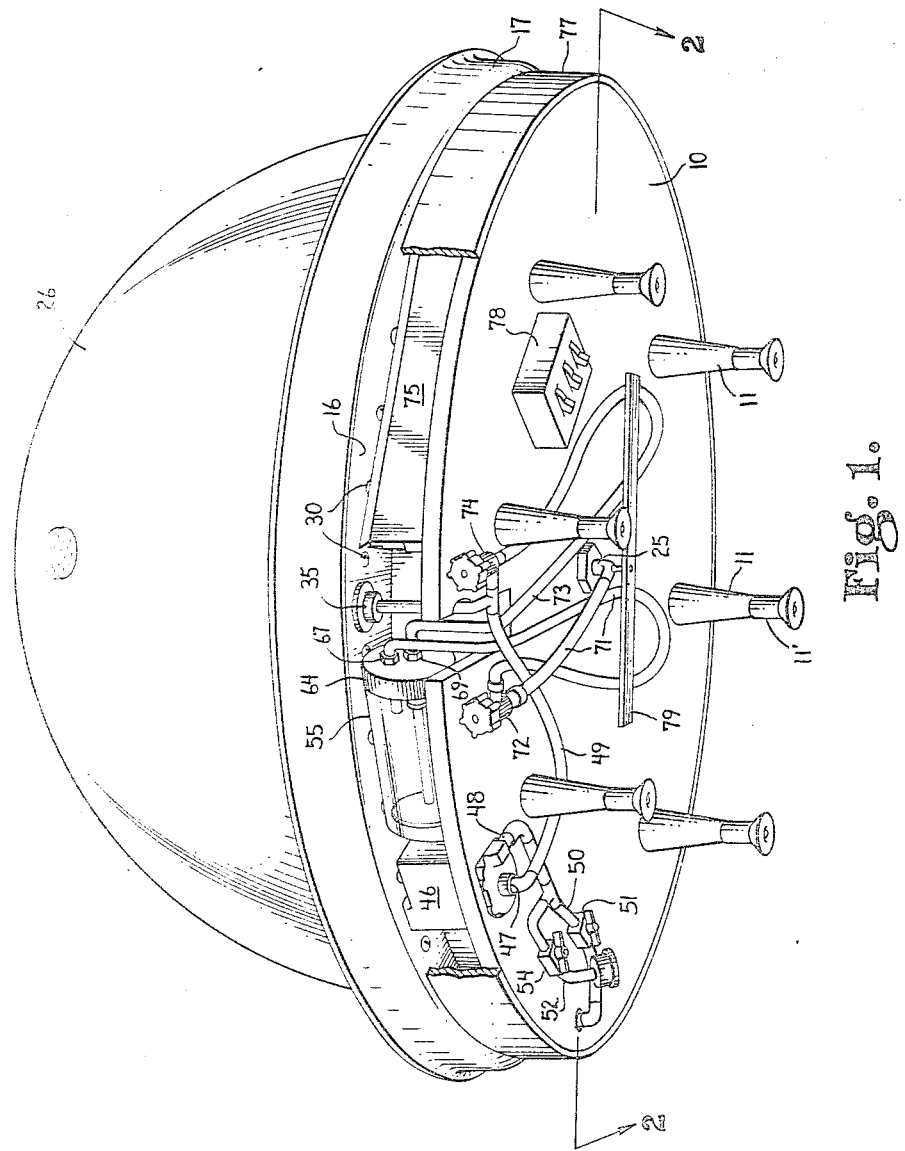
FIG. 1 is a perspective view of an aquarium constructed in accordance with the present invention, looking upwardly from beneath an imaginary surface upon which the aquarium is supported, parts being broken away for clarity of illustration.

In the preferred form of aquarium embodying the present invention, we provide a base or table 10 which is preferably supported above the floor upon perimetrally-interrupted support means such as, for instance, the illustrated legs 11. Preferably, each of said legs will be provided with a height-adjusting device 11' of well known construction whereby the upper surface 12 of the base 10 may be precisely leveled, regardless of minor irregularities in the floor or other surface upon which the assembly is supported.

A bowl, indicated generally by the reference numeral 13, is adapted to be supported upon the flat upper surface 12 of the base 10. Preferably, the bowl 13 is formed, by drawing or molding, from tralucent, synthetic plastic material to define a floor 14, an upstanding, perimetral side wall 15, a perimetrally-outwardly extending shelf 16 and an upstanding lip 17. The floor 14 presents a flat, planar surface having, however, a raised central portion 18 and raised ridges 19 radiating therefrom toward the perimeter of said floor. The planar area of the floor 14 has liquid-tight engagement with the surface 12 of the base 10 being, if necessary, cemented thereto by any suitable, liquid-proof adhesive, whereby the raised central region 18 and the ridges 19 cooperate with the surface 12 to define a central chamber and channels 21 leading thereto, said ridges being formed with perforations 20. Preferably, a false bottom 22 rests upon the raised regions of the floor 14 and is provided with perforations 23 registering with the perforations 20. Thus, the ridged appearance of the floor 14 is concealed and a flat platform for the support of rocks, shells, planters and the like is provided within the aquarium.

The base 10 is provided with a central port 24 therethrough, registering with the raised region 18 of the bowl floor, and a fitting 25 is secured therein for a purpose which will appear.

A dome 26, which is preferably drawn or molded from clear, transparent synthetic plastic, is provided with a polar egress port 27 and is formed to provide a continuous, perimetrally out-turned flange 28, said flange being proportioned and designed to fit within the lip 17 of the bowl 13 and to overlie the shelf 16 of said bowl. A suitable gasket 29 is interposed between the shelf 16 and the flange 28 to support said dome and to provide a circumscribing, liquid seal between said shelf and said flange. As shown, a plurality of screws 30 penetrate registering holes in the shelf 16 and the flange 28 to receive nuts 31 whereby said flange may be drawn toward said shelf to retain the dome in place and to compress the gasket 29. In some instances, it may be desirable to replace the screws 30 with studs effectively anchored in the shelf 16 or in the flange 28, some of said studs being plain to serve merely as dowels, and a few only of the studs being threaded or otherwise formed at their distal ends for the reception of nuts or other suitable securing means.

Preferably, though not necessarily, we provide a plug 32 which is frictionally received in the egress port 27 and whose base is formed with a plurality of perforations 33. In the absence of such a plug, there would be a somewhat remote risk that small fish might leap, or be swept, from the interior of the aquarium through the port 27.

A port 34 is formed in the shelf 16 and receives a one-way valve indicated generally by the reference numeral 35. As shown, the valve 35 comprises a plastic housing 36 formed with a nipple 37 at one end and with a radially outward flange 38 at its other end. A reduced, threaded extension 39 is proportioned and designed to pass through the port 34 and to receive a nut 40, whereby said housing may be secured in place. An integral, flexible flap 41 is hingedly movable about one edge, and its opposite edge is adapted sealingly to engage a shoulder 42. It will be apparent that said flap 41 will freely permit liquid flow downwardly as shown but will act automatically to prevent back flow upwardly through the port 34.

An inlet port 43 is formed in the side wall 15 of the bowl 13.

It will thus be seen that the bowl 13 and the dome 26 cooperate to define a main pool 44 which is surrounded by an auxiliary pool 45 defined by the shelf 16, the lip 17 and the base of the dome 26, said auxiliary pool being sealed from said main pool by the gasket 29 and being open to the atmosphere.

A pump 46 is supported on the base 10 outside the side wall 15 and below the shelf 16 of the bowl 13, said pump having, of course, an intake port 47 and a delivery port 48. Conduit means 49, which may preferably take the form of rubber hose, establishes a connection between the nipple 37 of the valve 35 and the intake port 47 of the pump 46. Conduit means 50 connects the delivery port 48 of said pump with the inlet port 43, an adjustable valve 51 being interposed in said conduit means 50. A branch pipe or hose 52 is connected in the conduit means 50, at a point between the delivery port 48 and the valve 51, and carries at its distal end a conventional hose coupling 53, a cut-off valve 54 being connected in said branch pipe 52.

Filter means is indicated generally by the reference numeral 55; and a preferred form of filter means is illustrated in detail in FIG. 4. As shown, the filter means comprises a jar or container 56, preferably formed from transparent material and having a closed end 57, the other end 58 of said container being open. Received within said container, preferably centrally thereof, is an open-ended standpipe 59 integrally secured to a base plate 60 which conforms to the internal contour of container 56 and is formed with a plurality of perforations 61 therethrough. A gasket 62, which may preferably take the form of an O-ring bearing upon the closed end and the perimetral wall of the container 56 supports the base plate 60 to establish a liquid tight seal defining a chamber beneath the base plate and communicating with the lower end of the standpipe 59.

The container 56 is substantially filled with a suitable filter medium indicated at 63, the base plate 60, however, sustaining the filter medium 63 against entry into the above-mentioned chamber.

The end 58 of the container is suitably fitted for removable, liquid-tight reception of a closure or cap 64. In the illustrated embodiment of the invention, said container end 58 is externally threaded and the cap 64 is formed to provide an internally threaded skirt; and a gasket 65 is confined and compressed between the cap and the container end to define a liquid-tight seal. Said cap is formed with an opening 66 in which is suitably mounted a fitting 67; and, in the illustrated embodiment of the invention, said cap is further formed with a second, central opening 68 with which is associated a fitting 69 which, in turn, carries an elongated shroud 70 proportioned and designed snugly to envelop the upper end of the standpipe 59 with a sliding, but liquid-tight fit. It will be seen on inspection that the shroud 70 is somewhat shorter than the cap skirt so that, as the cap 64 is loosened from the container 56, it will disengage the standpipe 59 before the cap is fully removed from the container, for a reason which will appear.

Conduit means 71, which includes a relatively long flexible section, connects the fitting 25 with the fitting 67, a cut-off valve 72 being interposed in said conduit means 71; and conduit means 73 connects the fitting 69, through a cut-off valve 74, with the conduit means 49 which, in turn, leads to the pump intake port 47.

It will now be apparent that, when the container 56 is charged with the filter medium 63, the gasket 62, standpipe 59 and base plate 60 being in position, and when the cap 64 is tightly in place on the container and the above-described connections to the fittings 67 and 69 are made, the filter 55 may be laid on its side on the table or base 10 below the shelf 16 and outside the side wall 15 of the bowl 13.

Suitable lighting units are likewise arranged on the base 10 in the same general region; and we prefer to use fluorescent units 75 of the general character illustrated and in substantially the illustrated arrangement. A nontransparent shield 77 is suitably arranged in circumscribing relation to the base 10 and to cooperate with the perimetral region of the shelf 16, to enclose the space in which said lighting units, the pump and the filter are arranged, and to hide those elements from view. Said shield 77 may be readily removable to provide access to the elements hidden thereby, or it may be provided with access doors at suitably spaced points.

An electrical control box 78 provided with suitable switches for the pump 46 and the lighting units may be arranged on the lower surface of the base 10, as shown; and we prefer to suspend from said surface, as well, a rack 79 for the support of slack in the several hoses.

With the bowl 13, dome 26 and gasket 29 assembled, the plug 32 will be removed and the main pool 44 will be filled with water through the port 27, bringing the water level clear to said port. Now, water is filled also into the auxiliary pool 45 in a quantity sufficient to fill all of the conduit means and the filter 55 as well as to establish a desired level of water in the auxiliary pool. Now, valves 51, 72 and 74 are opened and, with valve 54 closed, the pump 46 will be energized. Water will thus be caused to flow downwardly past the valve flap 41 and through the conduit means 49 to the pump intake port 47 and thence will be forced, through the delivery port 48 and the conduit means 50 and valve 51 to the aquarium inlet port 43. At the same time, water will flow downwardly from the main pool 44 through the conduit means 71 and valve 72 to the fitting 67 and thence into the container 56 where it will pass through the perforations 61 in the base plate 60 and will be drawn upwardly through the standpipe 59, shroud 70 and fitting 69 and, past the valve 74 through the conduit means 73 and thence to the pump intake. As water is delivered to the main pool, it will overflow through the port 27. Since that port is at the pole of the dome, such overflow water will tend to flow uniformly downward over the whole external surface of the dome. Lightly buffing that surface with a fine abrasive will facilitate such an even flow.

The overflowing water, of course, is received in the circumscribing auxiliary pool 45 whence it flows, past the valve 35, through the conduit means 49 back to the pump 46.

At the same time, water is drawn from the chamber beneath the bowl floor 14 through the fitting 25 and conduit means 71, past valve 72 and through fitting 67 into the container 56. As it flows through the filter medium 63 toward the perforations in the base plate 60, any entrained solid matter will be arrested by the filter medium so that only clear water penetrates the base plate 60 whence it is drawn through the standpipe 59, shroud 70 and fitting 69 and thence through the conduit means 73, past valve 74 and through conduit means 49 to the pump 46.

It is not strictly necessary continously to filter or to aerate the water in the aquarium. Desirably, the pump 46 will ordinarily be operated only during "observation hours"; i.e. at times when people may be expected to observe the aquarium; and ordinarily the controls will be so adjusted that part of the circulating water will be passed through the filter whenever the pump is operating. Adjustment of valve 74 will determine what proportion of the water drawn into constant-capacity pump 46 will be drawn from auxiliary pool 45 and what proportion will be drawn from the main pool 44 through port 24 and conduit 71 to pass through filter 55. At the same time, that adjustment will control the rate of overflow through port 27 and the level of water in the auxiliary pool 45. Most users will find it desirable so to adjust that valve as to provide for quiet, gentle emission of water through the port 27 at a rate only sufficient to maintain a continuous, thin film of flowing water over the entire external surface of the dome 26. Other users may prefer a fountain effect which may be obtained by further opening the valve 74; but the consequent rapid flow of water over the surface of the dome produces optical distortions which may be objectionable to some users.

After a period of use, it will be desirable either to cleanse, or to discard and replace, the filter medium 63 in the filter 55. To that end, the shield 77 will be removed and the filter 55 will be withdrawn from its position on the base 10, the slack, flexible hoses 71 and 73 facilitating such removal. With valve 72 closed, the cap 64 is loosened, whereby the shroud 70 will be disengaged from the standpipe 59 but will remain within the container 56. Now, because the valve 74 is open and because the seal at the upper end of the container 56 has been broken by loosening the cap 64, air can enter the container and water will be sucked out through the shroud 70 until the water level within the container drops below the lower end of the shroud 70. Thereafter, the valve 74 will be closed and the cap 64 may be removed. Because the water level in the container has been thus lowered, the container may be carried away without spilling. Now, the standpipe 59 and its attached base plate 60 will be removed, thereby withdrawing the filter medium 63 for discard or cleansing. After the interior of the container 56 is cleaned, the O-ring 62 will be replaced, the standpipe and its base plate will be returned to their illustrated position and the container will be recharged with clean filter medium and water, whereafter the cap 64 will be replaced so that the shroud 70 again envelops the upper end of the standpipe 59 and the gasket 65 makes a liquid-tight seal between the cap and the container. Now, the filter may be replaced in its position on the base 10, the hoses 71 and 73 will again be positioned on the rack 79 and, after replacement of the shield 77, the equipment is ready for normal use.

Alternatively, and in order to guard to a maximum degree against air lock in the pump, it may be desirable, after the cap 64 is replaced to engage the shroud 70 with the standpipe 59, but before the cap is tightened, briefly to open valve 72, while leaving valve 74 closed, to permit water to drain by gravity from the main pool 44 completely to fill the container 56. When the container is so filled, the valve 72 will be closed and the cap 64 will be tightened before replacing the filter on the base 10.

The dome 26, of course, is readily removable from the bowl 13 by loosening the nuts 31 or equivalent fastening means. First, of course, the level of water in the main pool must be lowered below the shelf 16; and this is readily accomplished in the following manner. With the valves 72 and 74 open, the valve 51 is closed and the valve 54 is opened. An ordinary garden hose may be connected to the coupling 53 and led either to waste or to a container, if it is desirable to save the water. Now, when the pump 46 is put into operation, water will be drawn from the main pool and from the auxiliary pool and will be discharged through the conduit 52 until the level in the main pool is lowered to the desired degree.

With the dome 26 removed, sand (if any), stones and plants, as desired, may be distributed on the false bottom 22 and quite large fish may be introduced into the mass of water standing in the bowl 13, after which the dome 26 may be replaced and the main pool may be refilled.

Smaller fish may be introduced, if desired, at any time through the port 27 upon mere removal of the plug 32.

The fish will normally be fed through the port 27. It is desirable, at feeding time, to lower the water level within the dome 26, not only to afford a larger surface area from which the fish may feed, but also to prevent the fish, in their eagerness, from leaping through the port 27. For this purpose, the operation of the pump 46 will be temporarily discontinued whereupon, with the valves 72 and 74 open, the flap 41 will be manually depressed, by manipulation with a finger or a rod through the opening 95 in the flange 28 which registers with the valve 35. Under the head of the water in the main pool 44, water will flow from the main pool, through port 43, past pump 46 and upwardly through the conduit means 49 and past the manually-opened flap 41 into the auxiliary pool 45 which has sufficient capacity to receive enough of the water from the main pool to lower the level therein to the desired degree for feeding. When the level in the dome reaches the desired position, the flap 41 is released and will automatically return to its illustrated position. After a suitable time has elapsed, the motor 46 will again be started. Whether or not the valves 72 and 74 are closed, the water level in the main pool 44 will thereby be raised until the dome is completely filled and overflow through the port 27 is again established.

Water temperature within the main pool will be maintained at an optimum value by suitable electrical heating means such as a submersible heater disposed either in the secondary pool 45 or in the main pool 44 and thermostatically controlled (not shown).

The particular construction of the elements 13 and 26 which define the main pool results in a highly desirable aesthetic effect which is believed to be novel. The water-filled transparent dome acts as a lens which magnifies objects within the dome and which can further produce refraction effects which render the side walls 15 of the bowl invisible and produce an effect of indirect interior illumination, completely obscuring the individual lighting units from view. In fact, it is noted that individual fish will disappear from view as they enter certain areas of the main pool. As a consequence, there is produced an illusion of a limitless area below the level of the shelf 16. At the same time, the continuous film or veil of flowing water covering the external surface of the dome produces a highly pleasing effect upon the vista within the dome.

In FIG. 7, we have suggested a modified form of aquarium for those who do not care for the cascade effect. In this form of the invention, the dome 26' is formed at its pole or apex with an upstanding, continuous flange 80 surrounding its polar port, said flange being formed with a lateral port 81 defined by a projecting nipple 82, conduit means 83 being connected to said nipple and leading either to the circumscribing auxiliary pool 45 or to a remote reservoir which is open to the atmosphere. Preferably, the conduit 83 will be a tube of flexible, tralucent plastic rendering it quite inconspicuous.

An imperforate cap 84 is formed for frictional, secure association with the distal edge of the flange 80 to constitute a port closure; and a foraminous baffle 85 is suspended from the cap 84, said baffle conforming in perimetral contour to the interior of the flange 80 and being disposed, when the cap is in place, substantially at the base of said flange and below the port 81. As shown, the baffle 85 is formed with an integral stem 86 which is frictionally received in a socket 87 formed interiorly of the cap 84.

In this form of the invention, of course, water overflowing from the main pool will be conducted by the conduit 83 to one form or another of reservoir where, since the reservoir is open to the atmosphere, the water will be aerated. In all other respects, this form of the invention is identical with the form illustrated in FIGS. 1 to 6, and will have all of the advantages of the previously-described form except for the optical and aesthetic effects of the film of water flowing over the external surface of the dome, and the aeration action resulting from such flowing film.

Figure 8:
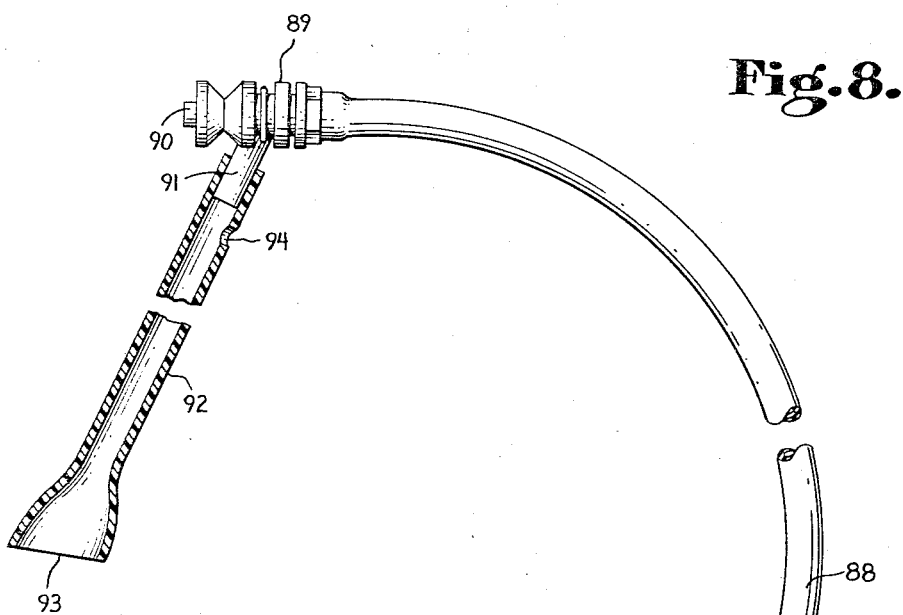
FIG. 8 is an enlarged, fragmentary illustration of an aquarium cleaning accessory constituting an optional feature of either form of the present invention, the nozzle element thereof being shown in section.
Figure 9:
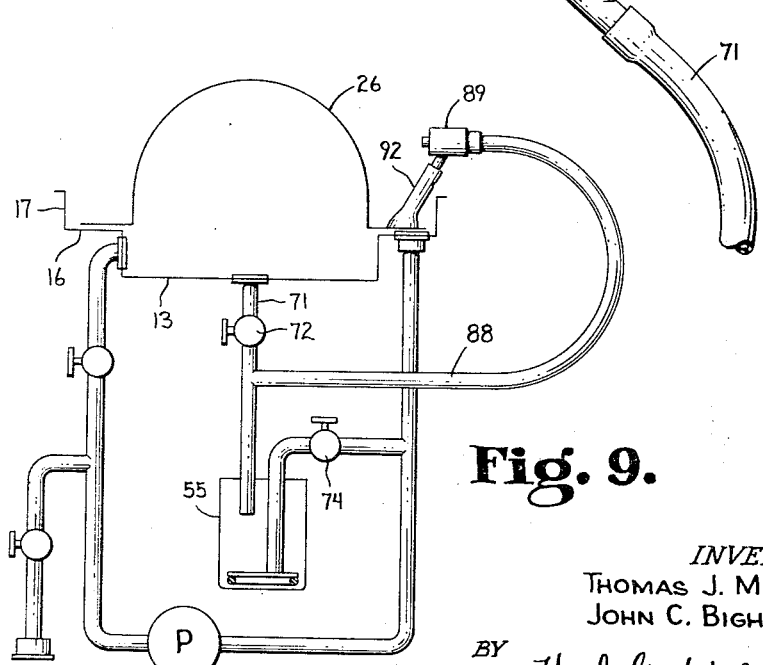
FIG. 9 is a flow diagram in which the cleaning means of FIG. 8 is incorporated.

In FIGS. 8 and 9, we have illustrated a cleaning accessory which may be utilized with either of the above-described forms of aquarium. As shown, a flexible conduit 88 is connected to the conduit 71 between the valve 72 and the filter 55. At its distal end, the conduit 88 carries a manually manipulable valve 89 provided with a push button 90 actuable to open the valve and having a lateral spout 91. A nozzle 92, preferably having an elongated but laterally narrowed mouth 93, is removably connectable to the spout 91. As shown, said nozzle preferably is provided with a lateral port 94 closely adjacent its proximal end.

With the valve 72 closed and the valve 74 open, it will be seen that operation of the pump 46 will tend to draw fluid through the conduit 88 whenever the valve 89 is open. Thus, when it is desired to clean the auxiliary pool, an operator, holding the valve 89 in his hand, may depress the button 90 to open the valve 89. With the distal end of the nozzle 92 submerged in the auxiliary pool, if the operator now places a finger over the port 94, liquid and any foreign material adjacent the mouth 93 of the nozzle will be drawn through the nozzle and the conduits 88 and 71 into the filter 55, where the foreign material will be arrested. Obviously, the mouth of the nozzle may be readily moved from place to place in the auxiliary pool 45 to pick up debris. If and when it becomes desirable similarly to clean the bowl 13, the accessory may be used in a similar manner after removal of the dome 26. To some extent, the accessory may be used, by entry of the nozzle through the port 27, to clean the interior of the main pool without removal of the dome 26.

We claim as our invention:

1. In a device of the class described, a liquid reservoir open to the atmosphere, a domed aquarium having an egress port at its top and an inlet port near its bottom, said domed aquarium establishing a main water pool and said reservoir establishing an auxiliary pool, and said aquarium egress port being in communication with said reservoir, a pump having an intake port and a delivery port, conduit means connecting said delivery port with said inlet port, and conduit means connecting said reservoir with said intake port.

2. The device of claim 1 in which said aquarium is provided further with a bottom outlet port, a filter, conduit means connecting said outlet port with said filter, and conduit means connecting said filter with said intake port.

3. The device of claim 2 including a valve in said conduit means connecting said outlet port with said filter and a valve in said conduit means connecting said filter with said intake port.

4. The device of claim 3 including a flexible branch pipe connected to said conduit means connecting said outlet port with said filter at a point between said first-named valve and said filter.

5. The device of claim 4 including a manually-manipulable valve at the distal end of said branch pipe and a nozzle connected to said branch pipe through said manually manipulable valve.

6. The device of claim 5 in which said nozzle is formed, near its proximal end, with an open lateral port.

7. The device of claim 2 including a cut-off valve in said conduit means connecting said delivery port with said inlet port, a branch pipe connected to said last-named conduit means between said pump and said cut-off valve, a cut-off valve in said branch pipe, and a hose coupling at the distal end of said branch pipe.

8. The device of claim 2 in which said filter comprises a container closed at one end and having a removable cap at its other end, a standpipe having a concentric, perforated base, gasket means received within said container, bottomed on the closed end of said container, supporting said standpipe base in spaced relation from said closed end and having a liquid-sealing engagement with said base and with said closed end in circumscribing relation to said standpipe, shroud means carried by said cap for liquid-tight, slidable envelopment of the distal end of said standpipe, and a filter medium substantially filling said container between said base and said cap, said cap being formed with a first port to which is connected said conduit means connecting said outlet port with said filter, and with a second port providing communication between the interior of said shroud means and said conduit means connecting said filter with said intake port.

9. The device of claim 1 including an upstanding flange surrounding said egress port, said flange having a lateral port therein, and closure means removably carried by the upper end of said flange, said liquid conducting means comprising a conduit connected between said lateral port and said reservoir.

10. The device of claim 9 in which said closure means is an imperforate cap disposed wholly above said lateral port, and a foraminous baffle suspended from said cap and disposed, when said cap is in place on said flange, wholly below said lateral port but within said flange, the transverse dimensions of said baffle substantially conforming to those of said egress port.

11. An aquarium comprising a base having a flat upper surface formed with a substantially central port therethrough, a bowl supported on said surface, the floor of said bowl being formed to provide a flat external surface interrupted by a plurality of raised ridges radiating from a central raised area and terminating short of the perimetral region of said floor, said ridges being perforated and said flat surface having a liquid-tight seal with said flat upper surface of said base with said central raised area of said floor in registry with said central port, a dome mating with said bowl to define a main liquid chamber, said dome being formed with an egress port substantially at its apex, a reservoir defining an auxiliary pool in communication with said egress port, a pump having an intake port and a delivery port, conduit means connecting said reservoir with said intake port, valve-controlled conduit means connecting said central port with said intake port, and conduit means connecting said delivery port with the interior of said bowl.

12. The aquarium of claim 11 in which said bowl is formed to define, with the base of said dome, an external, upwardly open, perimetral channel constituting said reservoir and overlying a portion of said base which circumscribes said bowl floor in upwardly spaced relation thereto, said egress port being open whereby liquid emitted through said egress port flows to said reservoir over the external surface of said dome which thus constitutes said means for conducting liquid from said egress port to said reservoir, said pump being supported on said base between the upper surface thereof and said channel, and a non-transparent shield circumscribing the space between said base and said channel.

13. The aquarium of claim 12 including a filter supported on said base between the upper surface thereof and said channel and within said shield, said filter being interposed in said conduit means connecting said central port with said intake port.

14. An aquarium comprising means establishing a main liquid pool and an auxiliary liquid pool, a transparent dome having a base portion, means including said dome base portion providing a liquid seal separating said main pool from said auxiliary pool, the interior of said dome being in communication with said main pool and the exterior surface of the base portion of said dome being submerged in said auxiliary pool, a pump having an intake port and a delivery port, conduit means connecting said auxiliary pool with said pump intake port, and conduit means connecting said delivery port with said main pool, said dome being formed with a port at its apex.

15. The aquarium of claim 14 including a filter having an inlet and an outlet, conduit means connecting said main pool with said filter inlet, and conduit means establishing communication between said filter outlet and said pump intake port.

16. The aquarium of claim 15 including valve means dominating flow through said conduit means which connects said pump delivery port with said main pool, other valve means dominating flow through said conduit means which connects said main pool with said filter inlet, and other valve means dominating flow through said conduit means which establishes communication between said filter outlet and said pump intake port.

17. The aquarium of claim 14 in which said first-named means comprises an upwardly-opening bowl having a bottom and an outstanding, perimetral shelf disposed at a level above said bottom and guarded by a continuous, upstanding lip, said dome base portion comprising an out-turned flange disposed substantially in a plane perpendicular to the polar axis of said dome, and said liquid seal means comprising a continuous gasket resting on the radially-inner region of said shelf and supporting said flange, said main pool thus being defined wholly within the perimeter of said gasket and said auxiliary pool being defined between said gasket and said lip.

18. The aquarium of claim 14 in which said auxiliary pool is perimetrally continuous and circumscribes the base portion of said dome, the floor of said auxiliary pool being disposed at a level above the floor of said main pool, said auxiliary pool floor being formed with a port, a one-way valve disposed in said port, the connection of said first-named conduit means to said auxiliary pool being through said one-way valve and said one-way valve opening away from said auxiliary pool, filter means mounted adjacent said main pool and said pump, said filter means comprising a filter medium, an inlet and an outlet separated by said filter medium from said inlet, the floor of said main pool being formed with a port, conduit means connecting said last-named port with said filter inlet, conduit means connecting said filter outlet with said pump intake port, and a liquid-permeable false bottom in said main pool spanning said main pool floor and spaced above said main pool floor.

19. An aquarium comprising a dome having a base and a polar point, said dome establishing a main liquid pool and being provided with a first port adjacent said polar point and with a second port in said base and with a supply port, a reservoir open to the atmosphere establishing an auxiliary liquid pool, said dome first port being in communication with said reservoir, a pump having an intake port and a delivery port, a first conduit means connecting said reservoir with said pump intake port, a second conduit means connecting said pump delivery port with said dome supply port, a filter having an inlet port and an outlet port, a third conduit means connecting said dome second port with said filter inlet port, and a fourth conduit means connecting said filter outlet port with said pump inlet port.

References Cited

UNITED STATES PATENTS

| | | | |
|---|---|---|---|
| 46,801 | 3/1865 | Ivers | 119—5 |
| 2,594,474 | 4/1952 | McGrath | 119—5 |
| 2,758,719 | 8/1956 | Line | 210—288 |
| 2,841,286 | 7/1958 | Abos et al. | 210—288 X |
| 2,888,205 | 5/1959 | Trucco | 119—5 |
| 3,025,831 | 3/1962 | Berardi | 119—2 |
| 3,057,094 | 10/1962 | Winkelman | 119—5 X |
| 3,146,195 | 8/1964 | Berardi | 119—5 X |
| 3,178,024 | 4/1965 | Jacuzzi | 210—288 |

ALDRICH F. MEDBERY, *Primary Examiner.*